W. SHAW.
PIGTAIL CONNECTION FOR CARBON BRUSHES.
APPLICATION FILED JUNE 5, 1909.
972,267.
Patented Oct. 11, 1910.
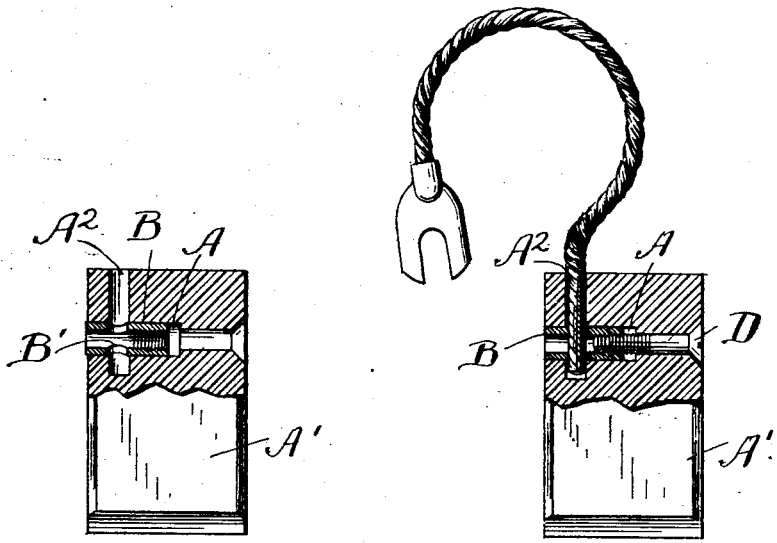
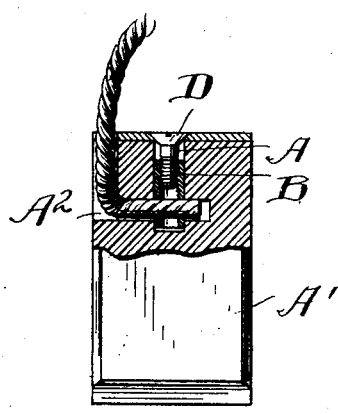
Witnesses
E. B. Gilchrist
H. R. Sullivan
Inventor
William Shaw
by
Thurston Woodward att'ys

UNITED STATES PATENT OFFICE.

WILLIAM SHAW, OF LAKEWOOD, OHIO, ASSIGNOR TO NATIONAL CARBON COMPANY, OF CLEVELAND, OHIO, A CORPORATION OF NEW JERSEY.

PIGTAIL CONNECTION FOR CARBON BRUSHES.

972,267.
Specification of Letters Patent.
Patented Oct. 11, 1910.

Application filed June 5, 1909. Serial No. 500,435.

*To all whom it may concern:*

Be it known that I, WILLIAM SHAW, a subject of the King of Great Britain, residing at Lakewood, in the county of Cuyahoga and State of Ohio, have invented a certain new and useful Improvement in Pigtail Connections for Carbon Brushes, of which the following is a full, clear, and exact description.

The present invention relates to means for effecting a direct electrical connection between carbon brushes and the "pigtail" cables therefor.

Many devices have been employed for connecting pigtail cables to carbon brushes and advantages of various sorts are urged in favor of each form devised. In many prior instances, however, it is necessary that the connection, in order to be effective, should be permanent and where it is not permanent the connection is apt to be inefficient.

My object has been to provide a connection which may be detachable, or which may be made permanent by the additional use of solder if it is desired to have it so, but which shall be equally effective so far as the electrical connection is concerned in either case.

The above objects and other desirable advantages it will be seen are attained by that embodiment of my invention described in the following specification and illustrated in the accompanying drawings, in which;

Figure 1 is a vertical transverse section through a brush illustrating one form of my securing device without the cable in place. Fig. 2 is the same section as that shown in Fig. 1 showing the cable in position and drawn against the carbon body. Fig. 3 is a similar section showing the modified form embodying the same generic principles.

As shown in the drawings, I drill a hole A into the carbon brush A', which hole may or may not extend entirely through the body of the brush, this being a matter of choice in construction. Into this hole is inserted a member B such as a tube or rod having a transverse perforation B' therethrough, which perforation may be formed in advance or drilled after the tube or rod is in place. In any event, it is my purpose that this transverse perforation in the rod shall be in alinement with a cable receiving hole $A^2$ extending from one face of the carbon body to and preferably a short distance beyond the perforated rod. The socket in which the rod B is located should be of sufficient length to permit the rod to have a small amount of longitudinal movement therein for the purpose of permitting the cable C, when inserted through the transverse perforation B' of the rod, to be drawn tightly against the side of the hole $A^2$ in the carbon body and thus effect a good electrical connection between the carbon body and the pigtail cable. For the purpose of moving the rod longitudinally in this manner it is provided at its end with screw threads designed to be engaged by the threads of a cap screw D inserted through a perforation of proper diameter and axis. By the proper adjustment of the cap screw it will be seen that the perforated rod may be moved with proper pressure for the purpose of effecting the desired result.

This structure is such that the cable may be detached from the brush at any time if it is desired and used for other brushes indefinitely. If, however, it is desired to make the attachment permanent mechanically, all that will be necessary, for example, in the form shown in Figs. 1 and 2 is to drop solder into the open end of the perforated tube. The connection will then be mechanically permanent but it is not necessary to do this in order to secure an efficient electrical connection, this latter being achieved by the construction in its generic form.

Having thus described my invention, I claim:

1. An attachment of pigtail cables to brushes for electrical apparatus, comprising a transversely perforated member inserted in a socket in the body of the brush and having some longitudinal play therein, said member being threaded near one end, a hole in the body of the brush transverse to the axis of the member, the transverse perforation of the member being in alinement with this last named hole for the purpose of receiving a cable end, and a cap screw inserted into the body of the brush and engaging the threads on the end of the perforated member.

2. In combination, a brush for electrical apparatus having a hole therein in which is inserted a member having a transverse perforation therethrough, a second opening in the body of the brush with which the transverse perforation in the member is alined, and means for moving the said member along its axis.

In testimony whereof, I hereunto affix my signature in the presence of two witnesses.

WILLIAM SHAW.

Witnesses:
H. R. SULLIVAN,
G. C. PHILLIPS.